Feb. 20, 1940.　　　　　S. J. COLE　　　　　2,190,699

AUTOMATIC CONTROL FOR RADIO APPARATUS

Filed Nov. 26, 1937　　　2 Sheets-Sheet 1

INVENTOR
Samuel J. Cole
BY
Harry C. Silnozdas
ATTORNEY

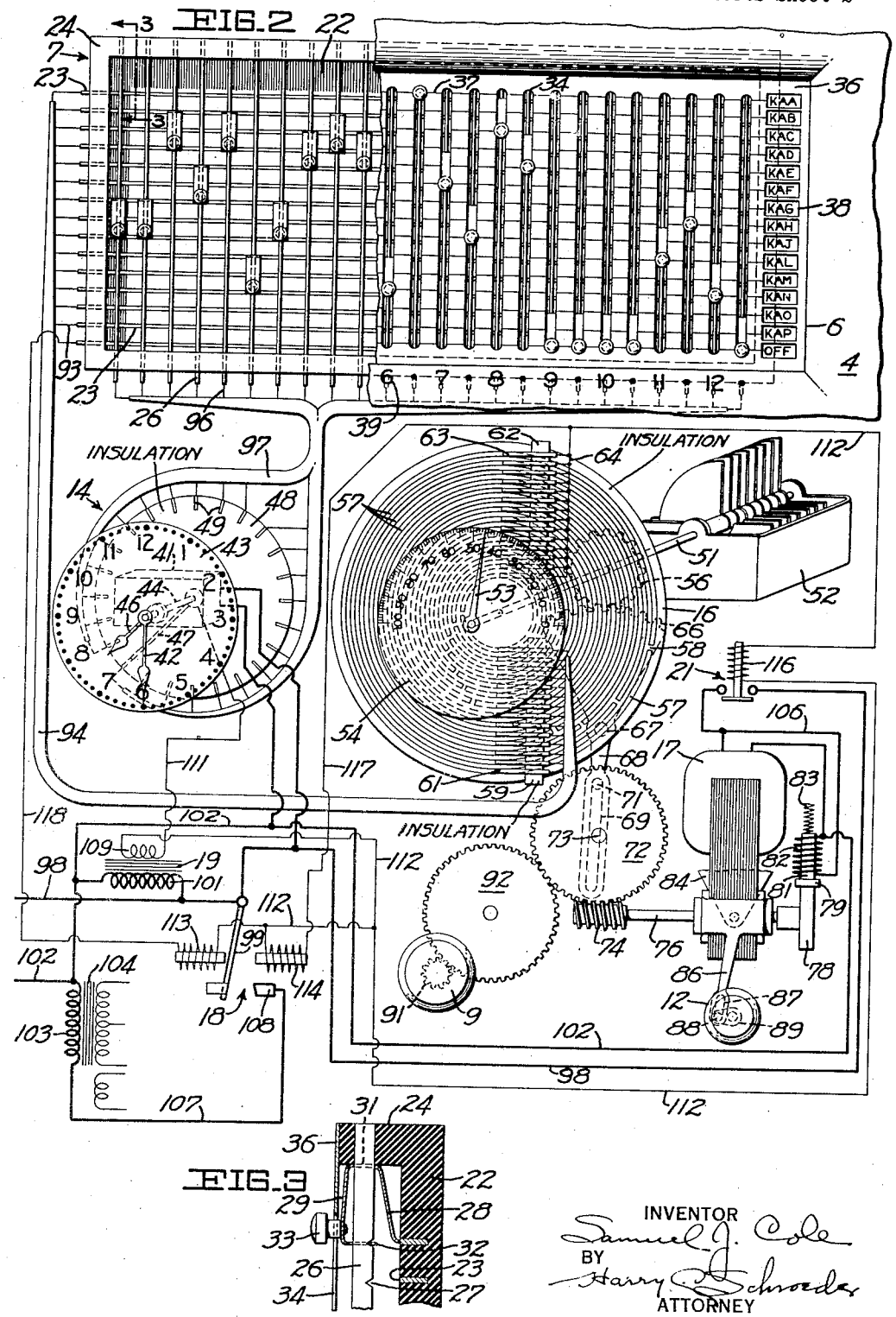

Patented Feb. 20, 1940

2,190,699

UNITED STATES PATENT OFFICE 2,190,699

AUTOMATIC CONTROL FOR RADIO APPARATUS

Samuel J. Cole, Alameda, Calif.

Application November 26, 1937, Serial No. 176,491

1 Claim. (Cl. 175—301)

This invention relates to electro-mechanical control of adjustable devices and has particular reference to the automatic control and tuning of such apparatus as radio receivers.

It is an object of the invention to provide apparatus which may be pre-set to govern different steps of adjustment in a device at predetermined periods over an extended interval of time.

Another object of the invention is to provide a control apparatus, adapted to be pre-set to produce a predetermined sequence of operations, in which the programmed series of operations are, at all times before, during and after their occurrence, instantly discernible to the operator.

A further object of the invention is to provide a control apparatus which may be quickly, easily and accurately set up to control a desired series of operations.

Still another object of the invention is to provide an apparatus, for the automatic control of such devices as radio receivers, which is sufficiently compact and simple in construction as to permit its installation in the usual receiver without materially increasing the size or the cost of the latter.

The invention possesses other objects and features of advantage, some of which, together with the foregoing, will be specifically set forth in the detailed description of the invention hereunto annexed. It is to be understood that the invention is not to be limited to the particular species thereof shown and described as various other embodiments thereof may be employed within the scope of the appended claim.

Referring to the drawings:

Figure 2 is a view, largely diagrammatic in character, showing the electrical connections between the various component parts of the control apparatus, some of these parts being shown in front elevation and some of them in perspective.

Figure 3 is a vertical sectional view of a portion of the program selector board. The plane in which the view is taken is indicated by the line 3—3 of Figure 2.

Figure 1:
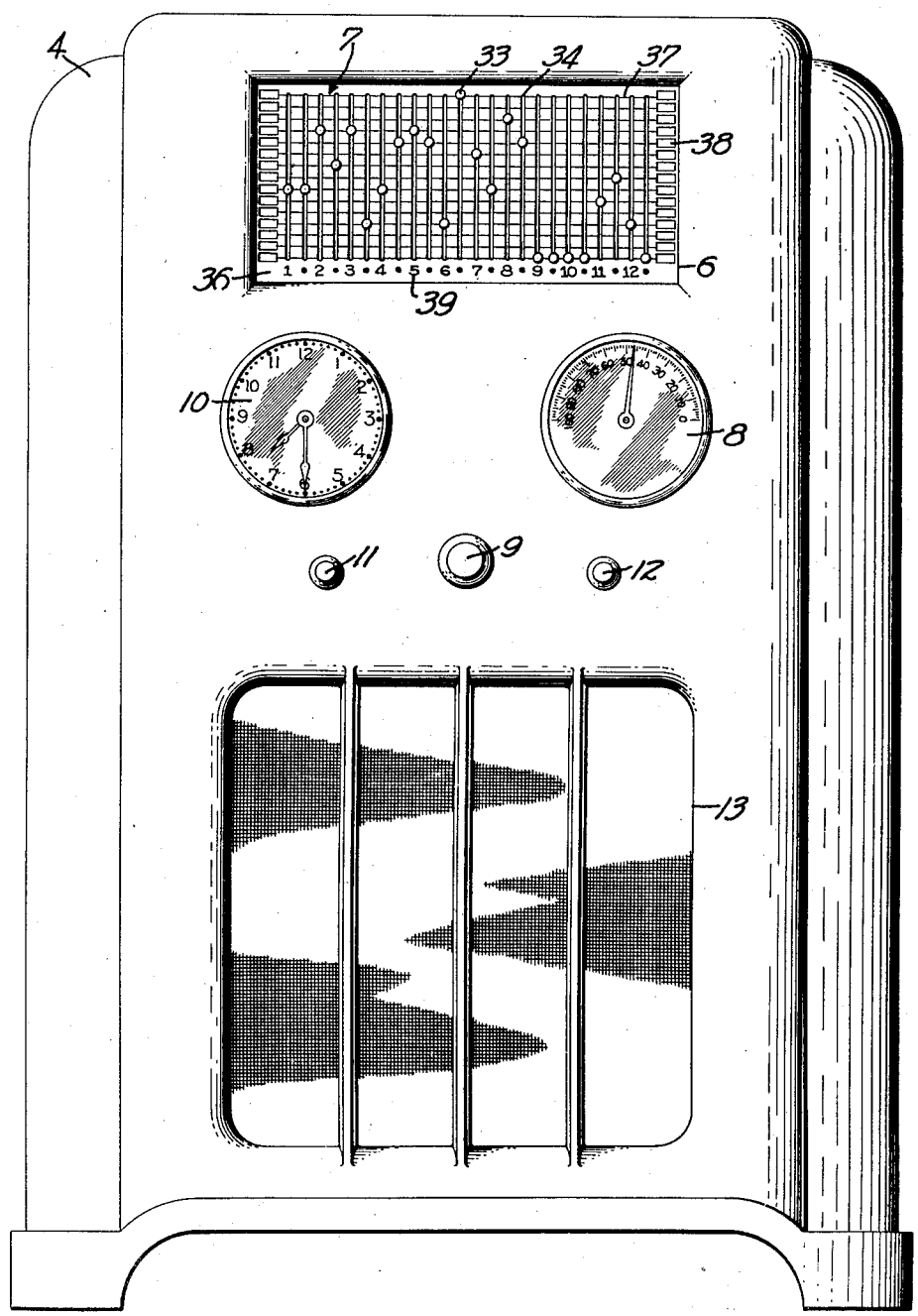
Figure 1 is a front elevational view of a radio receiver showing the exposed components which are manipulated by the operator to control the operation of my apparatus.

In Figure 1 I have shown a standard cabinet 4, for housing both the radio receiver and the control apparatus, having adjacent the top of the front panel thereof a rectangular opening 6 in which the program selector board, generally indicated by the reference numeral 7, is mounted. Below the board 7, and to the right of the panel, is the usual tuning dial 8 which is controlled by a centrally located tuning knob 9 and to the left of the panel, in horizontal alinement with the dial 8, is an electric clock 10 serving, in addition to telling time, as the actuator of the automatic control as will be described later. The usual manual on-and-off switch and volume control knob 11 is situated to the left of the tuning knob 9 and a knob 12 which serves to throw the automatic control into and out of operation as desired is located to the right of the tuning knob 9. The usual grilled opening 13, behind which the sound reproducer is located, occupies the lower portion of the panel.

Referring to Figure 2, the essential parts of the control apparatus are the program selector board 7, the clock-driven timing device 14, the tuning disk 16, the tuning motor 17, the automatic on-and-off switch 18, the step-down transformer 19, supplying low voltage current for the control circuits, and the tuning motor control relay 21.

The program selector board comprises a sheet 22 of insulating material having, embedded in a surface thereof, a plurality of separate spaced contact bars 23 and a marginal flange 24 rising above the surface in which the contact bars are embedded. Disposed transversely of, and spaced above, the contact bars are spaced bus bars 26 which are secured at their opposite ends in the flange 24 and are provided along one edge with spaced notches 27 corresponding in spacing to the spacing of the contact bars 23. This construction is best shown in Figure 3. Mounted for movement along each of the bus bars 26 is a substantially U-shaped contactor having a pair of arms 28 and 29, a bight 31 joining the latter arms, and an extension 32 rising perpendicularly from the end of the arm 29. Both the bight 31 and the extension 32 have apertures therein through which the bus bar 26 may freely pass and the contactor is flexed so that the distal end of the arm 28 will forcibly press against the edge of one of the contact bars 23 while the portion of extension 32 at the edge of its aperture will forcibly seat in one of the notches 27. The contactor thus provides electrical contact between the contact and bus bars and is locked in position against accidental dislodgement. A knob 33 is secured to the arm 29 and passes outwardly through one of a plurality of slots 34 formed in a plate 36 which overlies the plate 22. Parallel index lines 37 are scribed on the surface of the plate with which the knobs 33 are registrable when moved along the slots to indicate when the end of the arm 28 is contacting a bar 23 and the extension 32 is registered with a notch 27. At the end of each index line 27, except the bottom one which is marked "off", is a space 38 in which the call letters of various radio stations to be tuned may be written and the panel of the cabinet along the edge of the aperture, in which the selector board is mounted, is provided with indicia 39 alined with each slot 34 and indicating hours and fractions thereof. The markings shown on the drawing are spaced at half-hour intervals. However, the spacing may be given quarter-hour or hour value by rearranging the indicia 39.

The timing device comprises a conventional electric clock movement 41 provided with a shaft driving the minute hand 42 over the dial 43 and a shaft 44 which drives the hour hand 46. The shaft 44 is extended rearwardly and is provided with a contact arm 47 which moves over the surface of a plate 48 of insulating material at the rate of one revolution in twelve hours engaging, at the end of each half hour period, successive contacts 49. As stated above, the number of these contacts may be doubled so that contact will be established at the end of each quarter-hour period, or the speed of movement of the contact arm 47 may be doubled without disturbing the set-up of contacts shown, or any variation of the two may be accomplished to produce any timing desired. The number of contacts 49 is equal to the number of bus bars 26.

The tuning disk 16 forms part of the mechanism which includes the tuning motor 17. The former disk, which is constructed of insulating material, is secured for rotation with the shaft 51 of the tuning condenser 52 or other resonator of the radio receiver, the shaft also carrying the usual indicator 53, which moves over the tuning dial 54, and a toothed gear 56. Secured on the disk 16 are a plurality of separate concentric metallic rings 57 equal in number to the number of contact bars 23 and each ring has a gap 58 therein, that is, the rings are not continuous. These gaps are pre-set to move into registry with a fixed reference point when the tuning condenser shaft 51 is rotated to different angular positions to tune in the various stations. Overlying the disk at one side thereof is a block 59 of insulating material to which is secured a plurality of separate contact fingers 61 each of which makes contact with a ring 57 and whose distal ends terminate at the reference point mentioned above. A similar insulating block 62 overlies the disk substantially diametrically opposite the block 59 and is provided with a plurality of contact fingers 63 equal in number to the contact fingers 61 and each contacting a ring 57. The fingers 63 are not, however, electrically separate, as are the fingers 61, being each connected together by a common conductor 64.

The gear 56 is in mesh with the teeth formed at the periphery of a quadrant 66 which is pivotally mounted on a fixed pivot pin 67 and is provided with an oppositely extending lever arm 68 having a slot 69 extending therealong. A pin 71, slidably engaged in the slot 69, is mounted on a worm gear 72 for orbital movement about the shaft 73 of the latter, and the teeth of the worm gear mesh with a worm 74 fixed to the shaft 76 of the motor 17. The motor shaft 76 is extended and has fixed for rotation therewith a brake drum 78 against the periphery of which bears a brake shoe 79 mounted on the end of an armature 81. A solenoid winding 82 surrounds the armature 81 and a coil spring 83 bears against the latter to urge the brake shoe 79 into contact with the brake drum. Both the motor 17 and the brake just described, which is fixed to and forms an integral part of the motor, are pivotally mounted on a fixed bracket 84 and an arm 86, also forming an integral part of the motor and depending therefrom, has at its distal end a slot 87 in which the orbitally movable pin 88 carried by a lever 89, which is secured to the shaft controlled by the knob 12, is slidably engaged. It will be seen that by rotating the knob 12 the lever 86 will be swung to the right thereby causing the worm 74 to move out of mesh with the worm gear 72 and into a free position spaced therefrom. This permits manual control of the tuning condenser 52, the tuning knob 9 being connected to the worm gear by a pinion 91 and an intermediate gear 92. Thus automatic or manual operation of the receiver may be obtained at any time at the option of the operator. When the worm gear 72 is rotated, either by the motor 17 or by rotation of the tuning knob 9, the lever 68 and the quadrant 66 will be rocked back and forth about the axis of the pivot pin 67 and consequently the tuning condenser shaft 51 will be oscillated. The ratio between the gear 56 and the quadrant 66 is such that when the quadrant is moved from one extreme of movement to the other the tuning shaft will move through 180° of rotation or, with unconventional designs of receivers, sufficiently to move the condenser or other resonator completely through its tuning range.

Each of the contact bars 23, other than the bottom one, is connected by a conductor 93, which forms part of a multi-conductor cable 94, with each of the contact fingers 61 and each bus bar 26 is connected, by a conductor 96, forming part of a multi-conductor cable 97, with a contact 49 of the timing disk 48. One power lead 98 connects with the armature 99 of the on-and-off switch 18, with the primary winding 101 of the transformer 19, and with one contact of the relay 21. The other power lead 102 connects with the primary winding 103 of the power transformer 104 of the radio receiver, with the primary winding 101 of the transformer 19, with one end of the brake solenoid 82, and with one terminal of the field winding of the motor 17. A lead 106 connects the other contact of the relay 21 with both the field winding of the motor 17 and the brake solenoid 82. A lead 107 connects the end of the transformer winding 103, opposite to that connected to the power lead 102, with a terminal 108 of the on-and-off switch 18. The secondary winding 109 of the transformer 19 has one end thereof connected by a lead 111 with the contact arm 47 of the timer 14 and the other end thereof by a lead 112 with one end of each of the actuating coils 113 and 114 of the on-and-off switch 18, with one end of the actuating coil 116 of the relay 21 and with the common lead 64 connecting the brushes 63. An extension lead 117 connects the lead 112 with the opposite end of the actuating coil 114 of the on-and-off switch 18. The other end of the actuating coil 113 of the on-and-off switch is connected by a lead 118 with the lowermost contact bar 23 of the program selector board.

Describing the automatic operation of the apparatus step by step, the series of programs which are desired to be heard are first set up on the program selector board. This is done by moving the contactor knob 33 representing a certain time into registry with the intersection of the slot 34, along which the knob is being moved, and the line 37 indicating the station to be heard. For instance, in the slot marked "6" on the horizontal time scale, the knob has been moved into registry with the fourth line from the bottom of the board which is denoted "KAN". This station will therefore be tuned in at 6 o'clock. In the next slot, marked "6:30", the knob is registered with the uppermost line indicating that after the program from "KAN" is heard, the radio receiver will be, at 6:30 o'clock, automatically tuned from "KAN" to "KAA." The positions of the other knobs in their slots show what stations will be tuned in at each half hour interval until 12:30 o'clock. For instance, at 7:30 o'clock "KAJ" will be tuned in, etc.

In operation, the contact arm 47 moving in synchronism with the hour hand 46 of the clock, which latter is running continuously, passes over the surface of the plate 48 until it comes into engagement with one of the contacts 49, the one with which it is shown in registry in Figure 2 being designated as 7:30. As soon as this engagement takes place, current from the secondary winding 109 of the transformer 19, whose primary winding 101 is constantly energized from the supply leads 98 and 102, flows through the lead 111 to the contact arm 47, through the arm, through one of the conductors of the cable 97, which is connected to the bus bar 26, which is shown above the dot indicating the time of 7:30, along the bus bar until it reaches the sliding contact thereon, through the contact to one of the contact bars 23 which, in this instance, happens to be the one indicated by the letters "KAJ", through one of the conductors of the cable 94 to a brush 61 which contacts one of the rings 57 allotted to station "KAJ", through the ring to one of the brushes 63, through the lead 117 to and through the actuating coil 114 of the on-and-off switch 18 and through the lead 112 back to the secondary winding 109 of the transformer 19. This closes the switch 18 and energizes the power transformer 104 of the radio receiver. Simultaneously with the flow of current through the circuit just described, current will also flow from the lead 112 to and through the coil 116 of the relay 21 and through the extension of lead 112 back to the winding 109. This closes the relay 21, energizes the field of the motor 17, and simultaneously, by energizing the coil 82, releases the motor brake 79. The motor, now rotating, causes the worm gear 72 to rotate and reciprocate the quadrant 66 thereby oscillating the tuning condenser shaft 51. The disk 16, since it is fixed to the shaft 51, also oscillates until the gap 58 in the ring 57 thereof, through which current happens to be then flowing, comes into registry with the brush 61 contacting that particular ring whereupon the circuits including both the actuating coil 114 of the switch 18 and the relay coil 116 will be broken. This allows the relay 21 to open, deenergizing the motor 17 and applying the brake 79 due to deenergization of the coil 82. The switch 18 however will remain closed due to frictional engagement between the arm 99 and the contact 108. The receiver will now be tuned to receive station "KAJ" as indicated on the selector board since the gap of the ring 57 was preadjusted to come into registry with the brush 61 when this particular station was in tune. Nothing further will now occur until the contact arm 47 moves to the next succeeding contact 49, on the disk 48, which is representative of 8:00 o'clock. When this occurs, after the expiration of a half hour, the cycle of operation above described will be repeated except that station "KAC" will be tuned in as indicated by the positions of the knob 33 in the column marked "8" on the selector board.

The automatic tuning in of stations at the end of each half hour period will continue until, let us assume, 9:00 o'clock, when it is desired to turn off the receiver. It will be observed that the knobs 33 controlling the contacts in the columns marked 9:00, 9:30, 10:00 and 10:30 have been set to the position marked "off." As soon as the contact arm 47 of the clock reaches the contact 49 on the disk 48 designating 9:00 o'clock, current will flow from the secondary winding 109 of the transformer 19, through the lead 111, through the contact arm 47, through the conductor of the cable 97 which is connected with the bus bar 26 above the numeral 9 on the selector board, through the lowermost contact bar 23, through the lead 118 to and through the actuating coil 113 of the switch 18 and back to the transformer secondary winding 109 via the lead 112. This will cause the switch arm 99 to be snapped to the left thereby opening the switch 18 and deenergizing the receiver power transformer 103. This cycle, with the exception that the switch 18 will not be opened, since it is already in this condition, will occur at the end of each half hour period until 11:00 o'clock when the switch 18 will be again closed and the procedure for tuning in station "KAL" will be started, the apparatus functioning as described above when station "KAJ" was tuned in. It will thus be seen that the operation of turning the receiver on and off and tuning the same is entirely automatic and independent of human aid after the program of stations desired to be heard is set up on the program selector board. It will be obvious, of course, that at the end of the twelve hour period, which is the scope of the selector board, the latter will have to be reset to provide a new program of stations or to turn off the receiver at an hour beyond 12:30 o'clock.

By manipulating the knob 12, the motor 17 may be disconnected from the tuning mechanism and the tuning of the receiver may be then accomplished manually for as long a period as desired, returning the connection of the motor by remeshing the worm 74 and the worm gear 72 thereafter restoring the automatic operation without any of the apparatus getting out of synchronism.

I claim:

In an automatic electric control apparatus for radio apparatus, a selector board comprising a plurality of separate parallel spaced conductive contact bars, a plurality of separate conductive bus bars transversely overlying said contact bars, each of said bus bars having on an edge thereof a plurality of notches spaced in conformity with the spacing of said contact bars, and a contact member on each bus bar and movable therealong into contact with a selected one of said contact bars, said contact member comprising a substantially U-shaped strip of spring metal having in the bight thereof an aperture through which said bus bar is slidable and at the end of one arm thereof a perpendicular portion having an aperture therein through which said bus bar passes and a portion entering one of said notches, the other arm of said member resting on one of said contact bars, and a manually engageable element extending from one of said arms whereby said arm may be flexed to disengage the portion of said perpendicular portion of the arm resting in said notch from said notch.

SAMUEL J. COLE.